(12) United States Patent
Sakata et al.

(10) Patent No.: US 8,824,393 B2
(45) Date of Patent: Sep. 2, 2014

(54) WIRELESS COMMUNICATION DEVICE

(75) Inventors: Ren Sakata, Yokohama (JP); Noritaka Deguchi, Yokohama (JP); Masahiro Takagi, Tokyo (JP)

(73) Assignee: Kabusiki Kaisha Toshiba, Tokyo (JP)

( * ) Notice: Subject to any disclaimer, the term of this patent is extended or adjusted under 35 U.S.C. 154(b) by 189 days.

(21) Appl. No.: 13/189,917

(22) Filed: Jul. 25, 2011

(65) Prior Publication Data

US 2011/0280190 A1 Nov. 17, 2011

Related U.S. Application Data

(63) Continuation of application No. PCT/JP2010/050964, filed on Jan. 26, 2010.

(30) Foreign Application Priority Data

Jan. 29, 2009 (JP) ................................. 2009-017874

(51) Int. Cl.
*H04W 4/00* (2009.01)
*H04W 72/12* (2009.01)
*H04L 5/00* (2006.01)
*H04W 28/04* (2009.01)
*H04W 72/00* (2009.01)

(52) U.S. Cl.
CPC .......... *H04W 72/1273* (2013.01); *H04W 28/04* (2013.01); *H04W 72/005* (2013.01); *H04L 5/0053* (2013.01); *H04L 5/0007* (2013.01)
USPC .......................................... 370/329; 370/330

(58) Field of Classification Search
USPC ........................................................ 370/329
See application file for complete search history.

(56) References Cited

U.S. PATENT DOCUMENTS

| 2005/0265226 | A1* | 12/2005 | Shen et al. ...................... 370/210 |
| 2007/0021075 | A1* | 1/2007 | Nakao ............................ 455/101 |
| 2008/0273491 | A1* | 11/2008 | Han et al. ....................... 370/329 |

FOREIGN PATENT DOCUMENTS

| EP | 1973251 A1 * | 9/2008 | ................ H04L 5/00 |
| JP | 2008-048357 | 2/2008 | |
| JP | 2008-211657 | 9/2008 | |
| WO | WO 2007/080892 | 7/2007 | |
| WO | WO 2008/004681 | 1/2008 | |

OTHER PUBLICATIONS

Office Action dated May 11, 2012 in JP Application No. 2009-017874 with English-language translation.
International Search Report for PCT/JP2010/050964, mailed Apr. 27, 2010.
3GPP Technical Specification TS36.211; "Physical channels and modulation", Ver. 8.3.0, May 2008.
3GPP Technical Document R1-08-3015; "Update views on support of wider bandwidth in LTE-Advanced"; NTT DoCoMo, Inc. 2008.
Office Action dated Aug. 3, 2012 in JP Application No. 2009-017874 with English-language translation.

* cited by examiner

*Primary Examiner* — Shaq Taha
(74) *Attorney, Agent, or Firm* — Nixon & Vanderhye, P.C.

(57) ABSTRACT

Broadcast data is divided into a plurality of broadcast channels. Any of the plurality of broadcast channels is placed on a predetermined subcarrier in each of a plurality of main bands such that the placed broadcast channels differ from each other in a same frame and are consecutive in a predetermined order in a frame direction. The subcarriers are converted into a transmit RF signal and the transmit RF signal is transmitted.

11 Claims, 16 Drawing Sheets

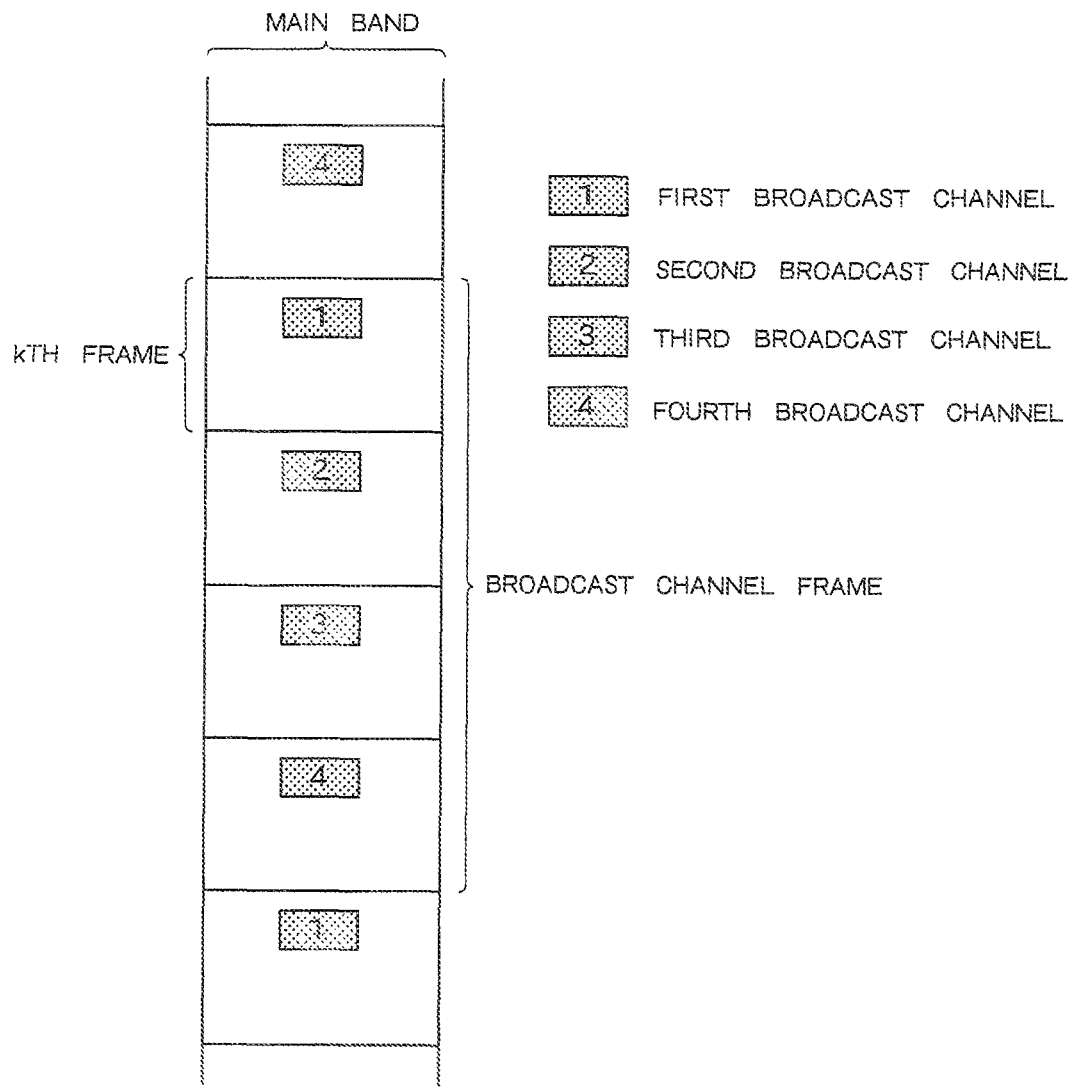
F I G. 8

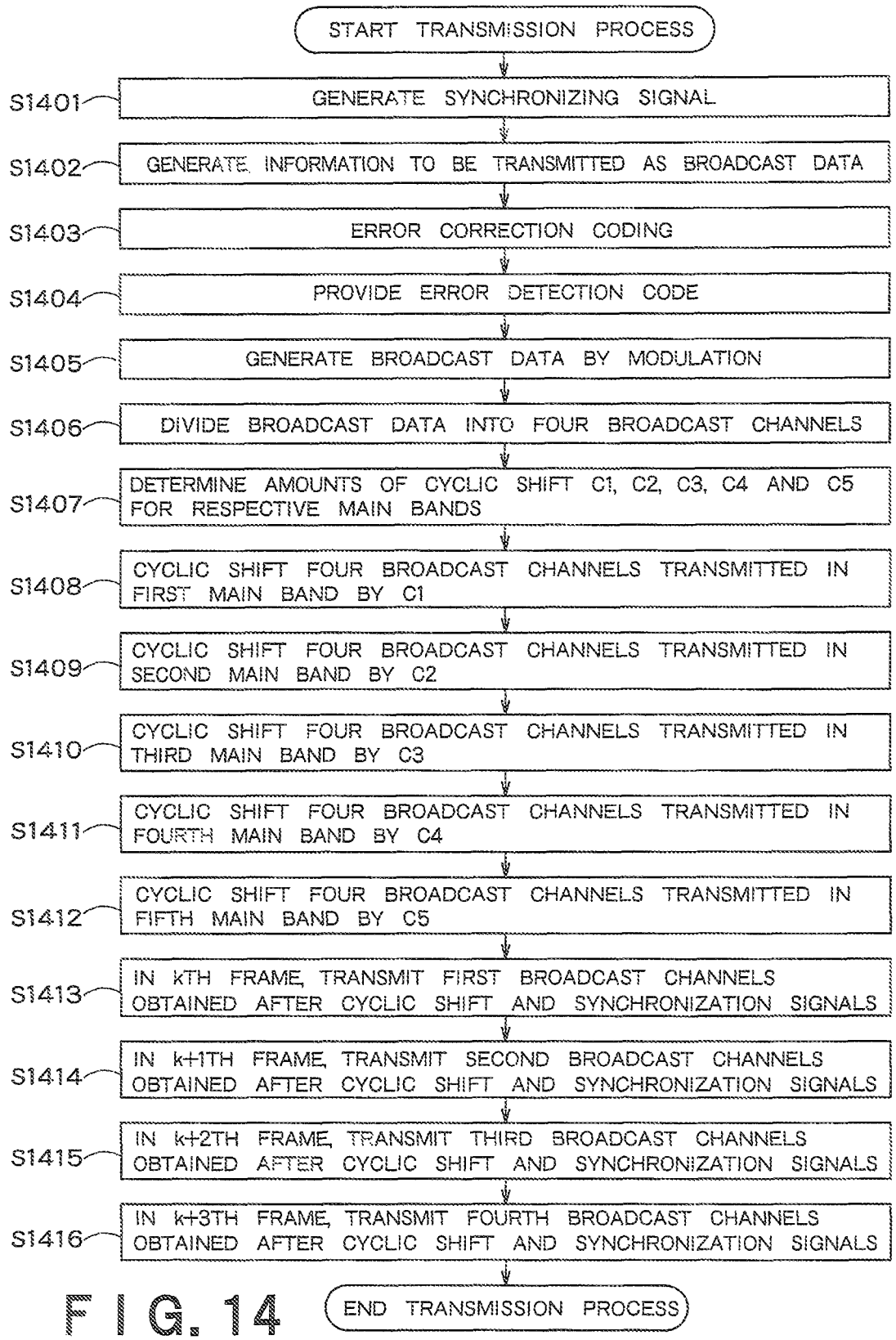
F I G. 14

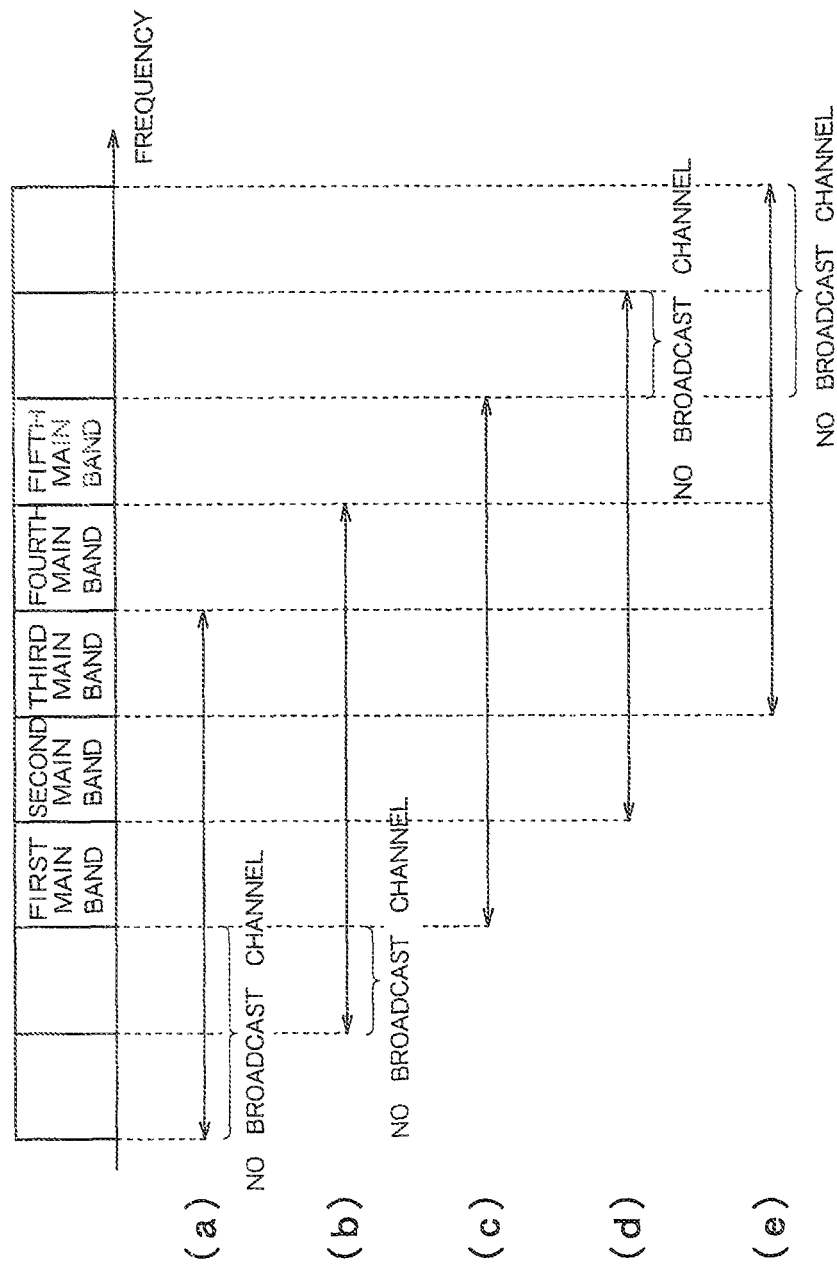
F I G. 16

WIRELESS COMMUNICATION DEVICE

This application is a continuation of International Application No. PCT/JP2010/050964, filed 26 Jan. 2010, which claims priority to JP 2009-17874, filed 29 Jan. 2009, the entire contents of which are hereby incorporated by reference in this application.

TECHNICAL FIELD

The present invention relates to a wireless communication device.

BACKGROUND ART

In cellular communication where communications are simultaneously performed with multiple users, broadcast channels which broadcast base station information and communication parameters are transmitted in one communication band where a base station performs transmission. The broadcast channels are transmitted after being made redundant so that even a terminal far away from the base station can receive the broadcast channels.

A method is known in which a base station divides broadcast data having been subjected to error correction coding, into four parts and thereby generates four broadcast channels, and repeatedly transmits the four broadcast channels one by one using temporally consecutive four frames (see, for example, Non-Patent Document 1). A terminal receives the four broadcast channels but may start receiving them from a middle broadcast channel. Thus, while rearranging the order, a pattern (arrangement order) with which reception can be performed properly is found and then the broadcast data is obtained. Furthermore, the terminal establishes synchronization of a broadcast channel cycle with the base station by detecting the position of the first broadcast channel among the four broadcast channels.

A technique is known to improve throughput by allowing a terminal to have the function of receiving a plurality of communication bands (see, for example, Non-Patent Document 2).

However, when a terminal that can only receive a single communication band (single-band terminal) is present on the same network as a terminal having the function of receiving a plurality of communication bands (multi-band terminal), in order that the single-band terminal can receive broadcast data, a base station repeatedly transmits a plurality of broadcast channels one by one, with an identical broadcast channel being allocated to each of a plurality of communication bands in one frame.

Hence, the multi-band terminal needs to receive broadcast channels for four frames to receive broadcast data which is divided into four parts in the above-described manner, causing a problem of a reduction in throughput.

PRIOR ART DOCUMENTS

Non-Patent Documents

Non-Patent Document 1: 3GPP, "Evolved Universal Terrestrial Radio Access (E-UTRA); Physical Channels and Modulation (Release 8)," TS36.211, ver. 8.3.0 (2008)

Non-Patent Document 2: NTT DoCoMo, "Update Views on Support of Wider Bandwidth in LTE-Advanced," 3GPP Technical Document, R1-083015 (2008)

DISCLOSURE OF THE INVENTION

Problems to be Solved by the Invention

An object of the present invention is to provide a wireless communication device capable of preventing a reduction in the throughput of a multi-band terminal and allowing a single-band terminal to receive data properly.

Means for Solving the Problems

A wireless communication device according to one aspect of the present invention, that performs communication through first to nth main bands (n is an integer greater than or equal to 2), includes a data generating unit that generates broadcast data, a dividing unit that divides the broadcast data into m broadcast channels (m is an integer greater than or equal to 2), a control unit that generates first to nth amounts of shift to be provided to signals transmitted in the first to nth main bands, a kth shift unit that outputs the m broadcast channels in an order of transmission of the m broadcast channels in a kth main band, the order being determined according to a kth amount of shift (k is an integer satisfying $1 \leq k \leq n$), a placing unit that places the broadcast channels outputted from the kth shift unit, on subcarriers in the kth main band, and a transmitting unit that converts the subcarriers in the first to nth main bands into a transmit RF signal and transmits the transmit RF signal, the subcarriers having the broadcast channels placed thereon.

A wireless communication device according to one aspect of the present invention includes a receiving unit that receives a signal in which any of a plurality of broadcast channels is placed in each of a plurality of main bands such that the placed broadcast channels differ from each other, the broadcast channels being obtained by dividing broadcast data, an extracting unit that extracts the broadcast channels from the respective plurality of main bands, and a demodulating unit that connects the extracted broadcast channels and thereby obtains the broadcast data.

Effect of the Invention

According to the present invention, a reduction in the throughput of a multi-band terminal can be prevented and a single-band terminal can be allowed to receive data properly.

BRIEF DESCRIPTION OF THE DRAWINGS

FIG. 8 is a diagram describing the order of transmission of broadcast channels.

FIG. 14 is a flowchart describing a method of transmitting broadcast channels according to the embodiment.

FIG. 16 is a diagram showing exemplary reception of broadcast channels.

MODE FOR CARRYING OUT THE INVENTION

An embodiment of the present invention will be described below based on the drawings.

Figure 1:
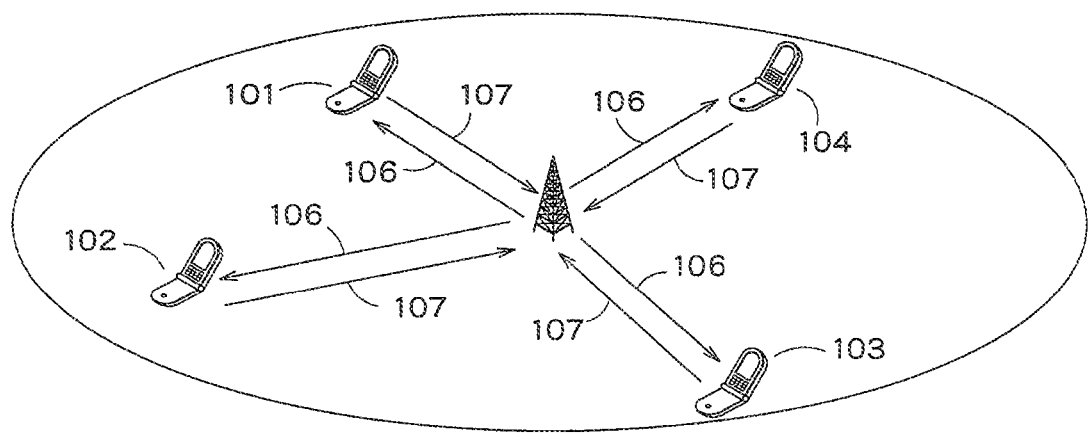
FIG. 1 is a schematic configuration diagram of a wireless communication system according to an embodiment of the present invention.

FIG. 1 shows a schematic configuration of a wireless communication system according to an embodiment of the present invention. The wireless communication system includes terminals 101 to 104 and a base station 105. Downlinks 106 are used for communication from the base station 105 to the terminals 101 to 104. Uplinks 107 are used for communication from the terminals 101 to 104 to the base station 105. The terminals 101 to 104 are classified into single-band terminals and multi-band terminals by different receive bandwidths. A single-band terminal and a multi-band terminal will be described later. Although FIG. 1 shows four terminals 101 to 104, the number of terminals is not limited thereto.

Figure 2:
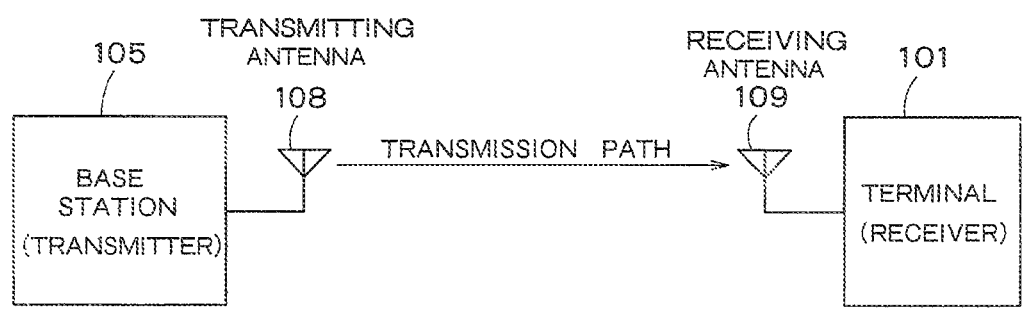
FIG. 2 is a diagram showing exemplary communication using a downlink.

FIG. 2 shows an example of communication using a downlink between the terminal 101 and the base station 105. The base station 105 which is a transmitter performs modulation on transmit data and transmits the transmit data as an RF signal from a transmitting antenna 108. The RF signal transmitted from the base station 105 passes through a transmission path and reaches a receiving antenna 109 of the terminal 101 which is a receiver. The terminal 101 performs a reception process on the signal received by the receiving antenna 109, and thereby obtains data transmitted from the base station 105.

Figure 3:
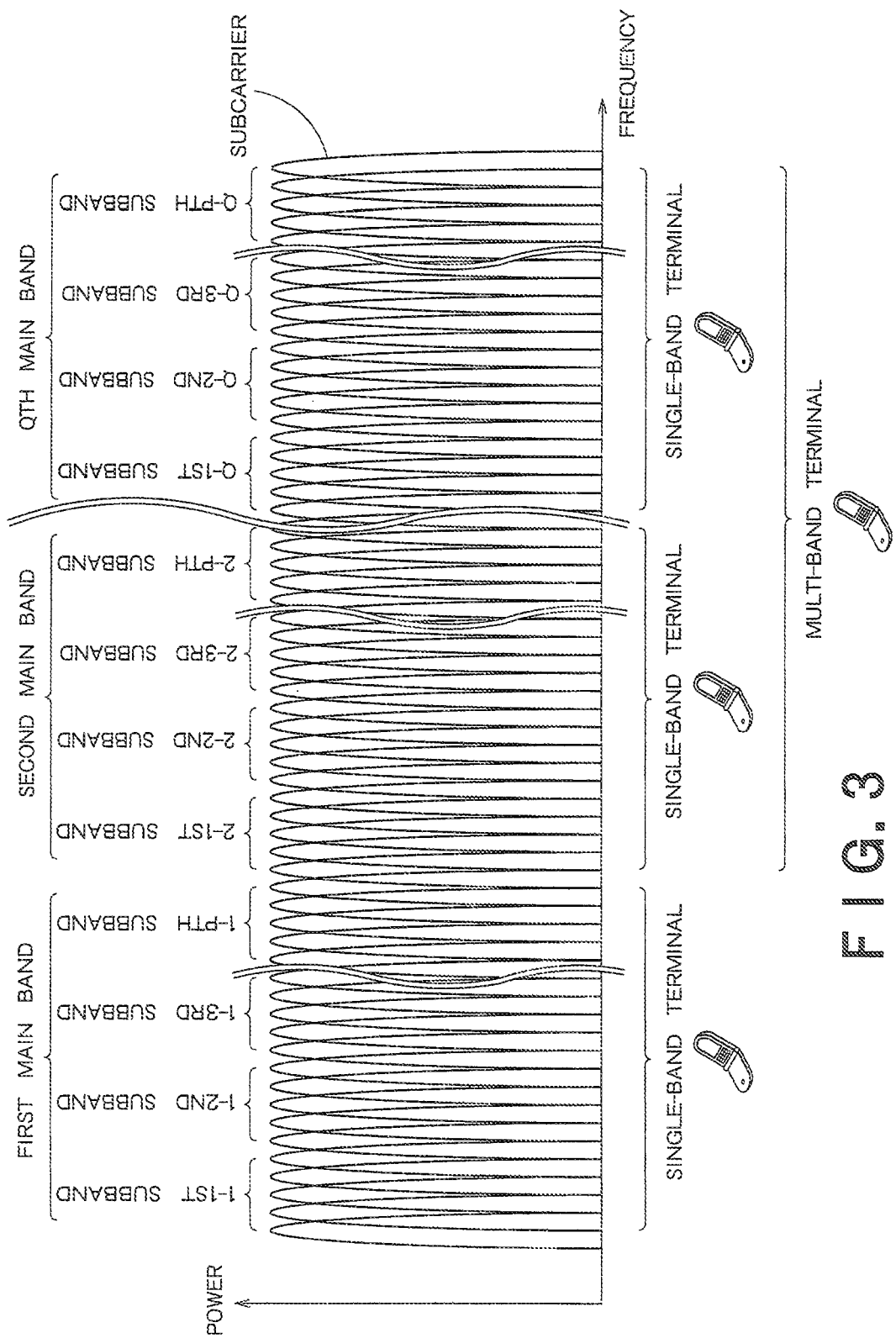
FIG. 3 is a diagram showing an example of a subcarrier structure of OFDMA.

A single-band terminal and a multi-band terminal will be described using FIG. 3. FIG. 3 shows a subcarrier structure of OFDMA (Orthogonal Frequency Division Multiple Access) which is an example of a wireless communication scheme in the present embodiment. A plurality of subcarriers are grouped into Q main bands (Q is an integer greater than or equal to 2). In addition, one main band is divided into, for example, P subbands (P is an integer greater than or equal to 2) but the configuration is not limited thereto.

In the present embodiment, a single-band terminal refers to a terminal capable of receiving only one main band. A multi-band terminal refers to a terminal capable of simultaneously receiving a plurality of main bands. In the wireless communication system, single-band terminals and multi-band terminals exist and, for example, the terminals 101 to 103 are single-band terminals and the terminal 104 is a multi-band terminal.

It is desirable that a single-band terminal be able to communicate using any main band. Therefore, signals transmitted in the respective main bands are all configured to allow a single-band terminal to receive data properly. A data transmission method will be described later.

Figure 4:
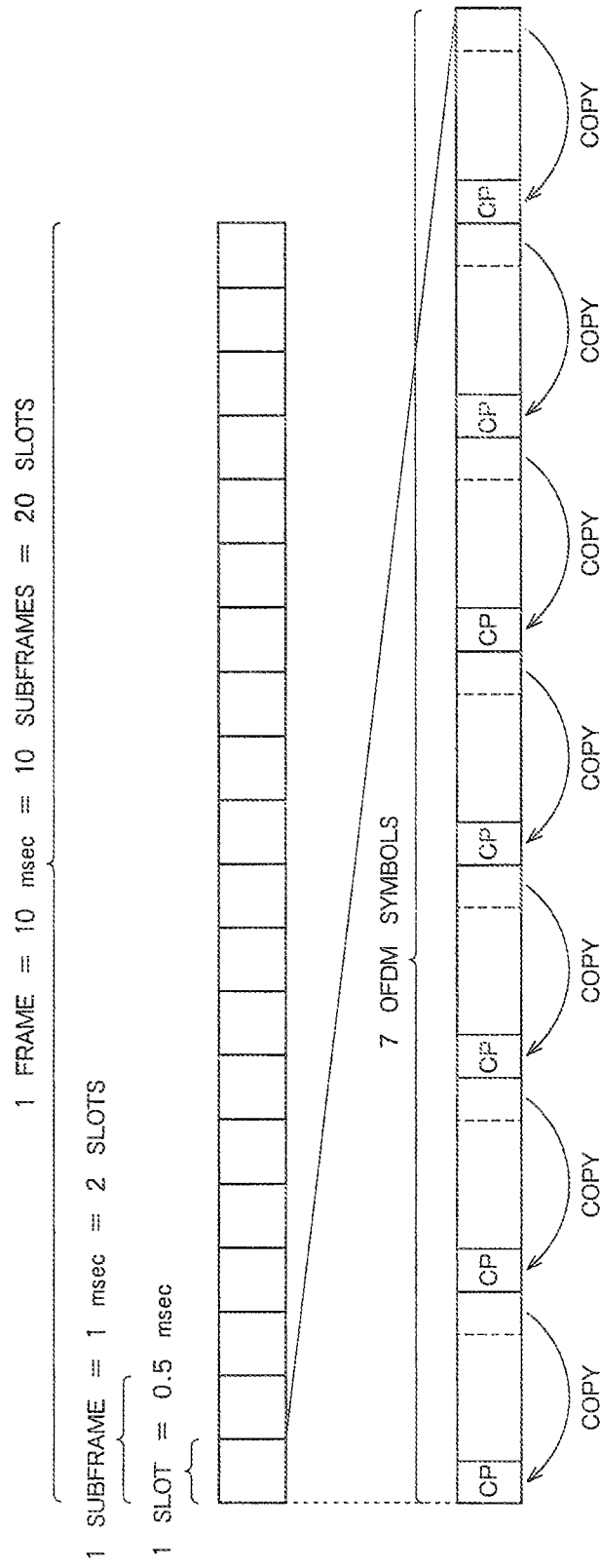
FIG. 4 is a diagram showing an example of a frame configuration in a time direction of a transmit signal.

FIG. 4 shows an example of a frame configuration in a time direction of a transmit signal. One frame is 10 msec in duration and is divided into 10 subframes of 1 msec each. Each subframe is divided into two slots of 0.5 msec each.

One slot includes seven OFDM symbols. In one OFDM symbol, a copy of the last part of the symbol which is cut out for a predetermined period of time (Cyclic Prefix (CP)) is added at the beginning of the symbol.

Figure 5:
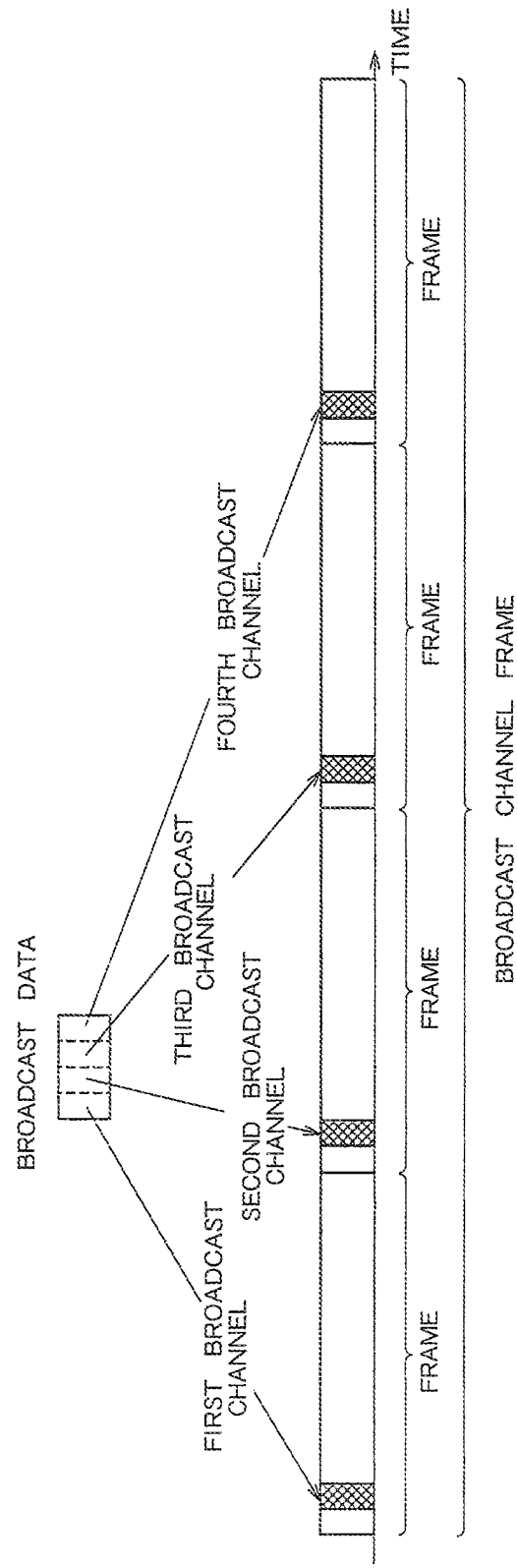
FIG. 5 is a diagram showing exemplary transmission of broadcast data.

A method of transmitting broadcast data will be described using FIG. 5. Broadcast data is data having described therein, for example, an ID number of the base station 105, the number of transmitting antennas 108 provided to the base station 105, and other parameters of a transmit signal, and is broadcast from the base station 105. In the present embodiment, broadcast data is subjected to error correction coding, addition of error detection code, and modulation in the base station 105.

When the base station 105 transmits broadcast data, first, the base station 105 divides the broadcast data into four parts and thereby generates a first broadcast channel, a second broadcast channel, a third broadcast channel, and a fourth broadcast channel. Then, the base station 105 transmits the first to fourth broadcast channels in turn one by one per frame. In the following section, four consecutive frames where the first to fourth broadcast channels are transmitted are collectively referred to as a broadcast channel frame.

An example of a method of transmitting a broadcast channel in one frame in one main band will be described using FIG. 6. Various transmit signals transmitted from the base station 105 are transmitted using a plurality of subcarriers in the central portion of a main band. During one frame, a broadcast channel is transmitted once and a synchronization signal for detecting the beginning of a frame is transmitted twice. The timing at which the broadcast channel is transmitted is the second slot of a first subframe. The timings at which the synchronization signals are transmitted are the first slot of the first subframe and the first slot of a sixth subframe.

In the present embodiment, the number of subcarriers used for transmission of a synchronization signal is smaller than the number of subcarriers used for transmission of a broadcast channel.

Figure 7:
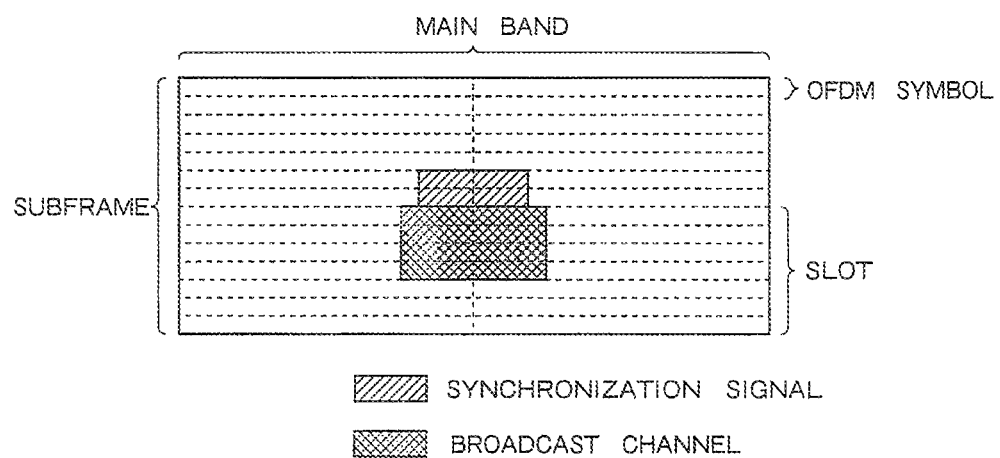
FIG. 7 is a diagram showing exemplary transmission of a broadcast channel in one subframe.

Using FIG. 7, details of exemplary placement of the broadcast channel and the synchronization signal in the first subframe will be described. As described in FIG. 4, one subframe includes 14 OFDM symbols. The synchronization signal is transmitted in the sixth and seventh OFDM symbols. The broadcast channel is transmitted in the seventh to tenth OFDM symbols.

In addition, as described above, synchronization signals and broadcast channels are transmitted using a plurality of subcarriers in the central portion of the main band. A terminal can perform frame synchronization and obtain broadcast data by receiving only a bandwidth used for synchronization signals and broadcast channels in the central portion of the main band.

Using FIG. 8, the order of transmission of first to fourth broadcast channels in one main band will be described. In order that a single-band terminal can receive broadcast data, all of the first to fourth broadcast channels are transmitted in one main band. If the order of transmission of the first to fourth broadcast channels is changed, then the terminal needs to detect the changed order. To avoid such a process, as shown in FIG. 8, the first to fourth broadcast channels are repeatedly transmitted with this order being kept.

The terminal 101 which is a single-band terminal does not always start receiving from a first broadcast channel, and may start receiving from a middle one of the first to fourth broadcast channels. For example, the timing at which reception is started may be a second broadcast channel. Even in such a case, by receiving four frames, four broadcast channels can be received.

Note, however, that in this case since the terminal 101 receives a second broadcast channel, a third broadcast channel, a fourth broadcast channel, and a first broadcast channel in this order, the terminal 101 needs to rearrange the order of the four broadcast channels. At this stage, since the terminal 101 has not grasped a boundary of a broadcast channel frame, the terminal 101 does not know how many broadcast channels there are before the broadcast channel received first.

Hence, the terminal 101 assumes four different patterns (arrangement orders) for the respective cases in which the broadcast channel received first is the first broadcast channel, the second broadcast channel, the third broadcast channel, and the fourth broadcast channel, and tries demodulation using each pattern. The terminal 101 then detects an order with which demodulation can be performed properly, and obtains broadcast data. Then, by finding the order with which reception can be performed properly, the time of transmission of the first broadcast channel can be identified.

For example, in an example shown in FIG. 8, it can be detected that a first broadcast channel is transmitted in a kth frame and the start time of the kth frame is a boundary of a broadcast channel frame.

Figure 6:
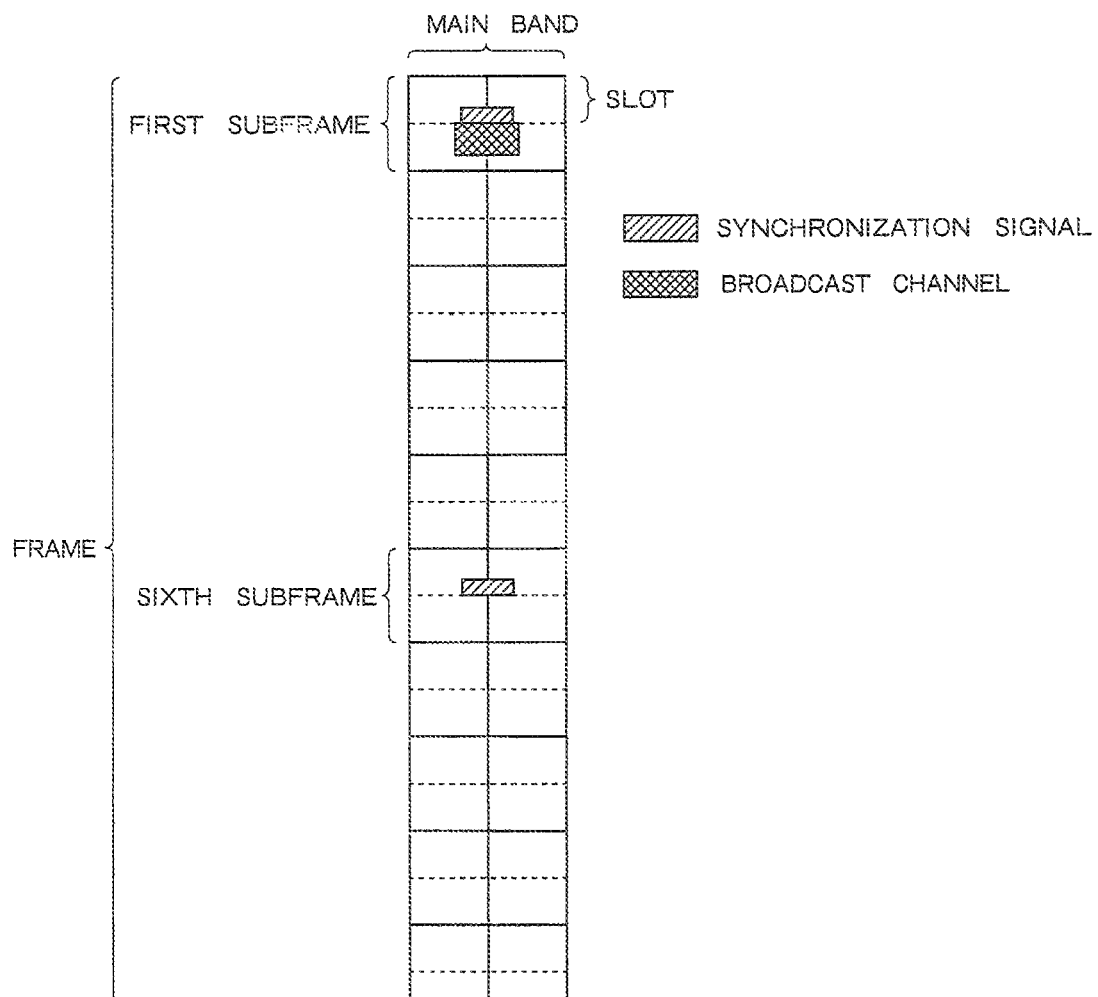
FIG. 6 is a diagram showing exemplary transmission of a broadcast channel in one frame.
Figure 9:
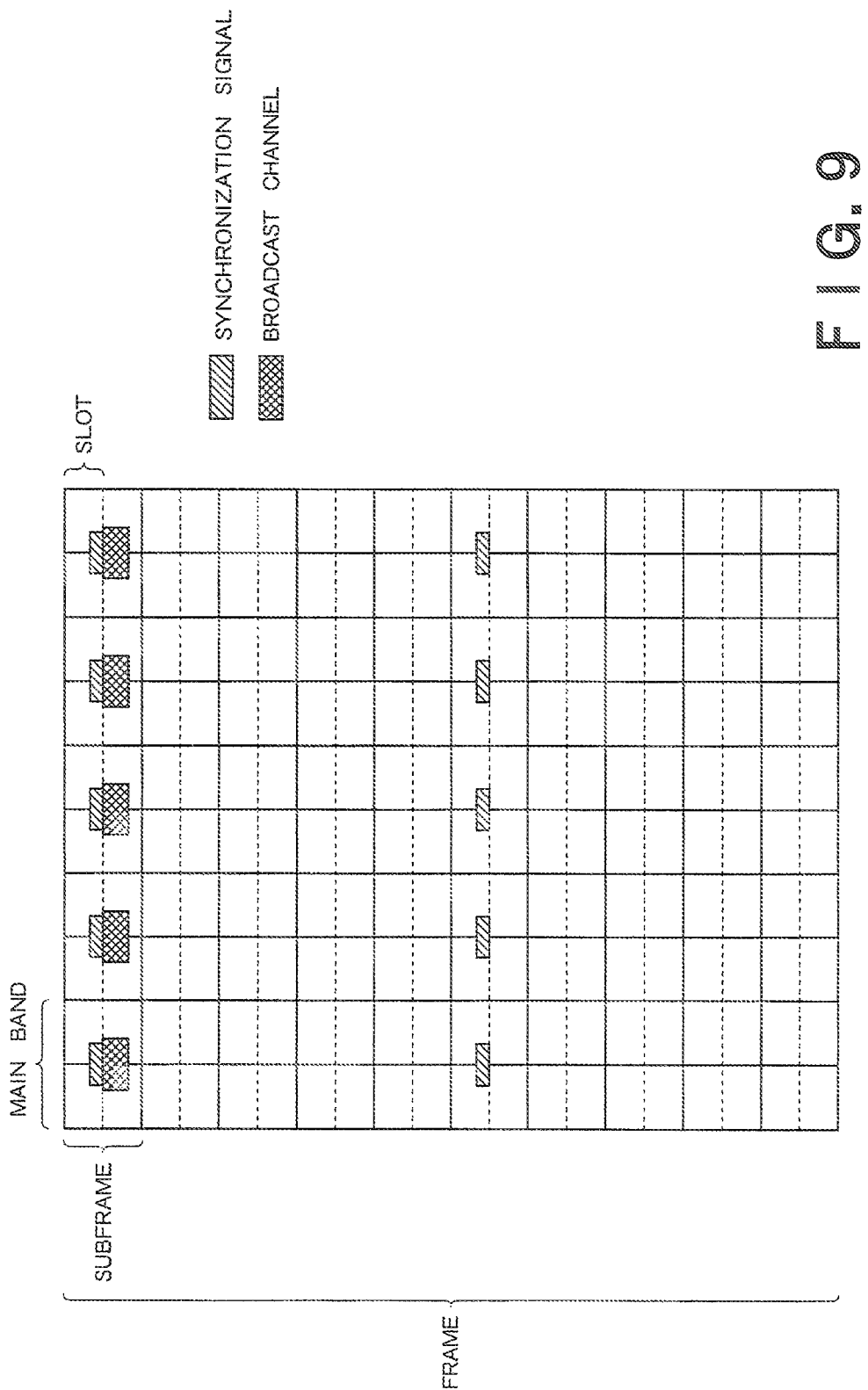
FIG. 9 is a diagram showing exemplary transmission of broadcast channels in one frame in a plurality of main bands.

FIG. 9 shows an exemplary configuration of a transmit signal from the base station 105 for when the placement of a broadcast channel and synchronization signals in one main band shown in FIG. 6 is applied to a plurality of main bands such as those shown in FIG. 3. As shown in FIG. 9, by transmitting synchronization signals and broadcast channels in all main bands, a single-band terminal can obtain broadcast channels regardless of which main band is received.

Figure 10:
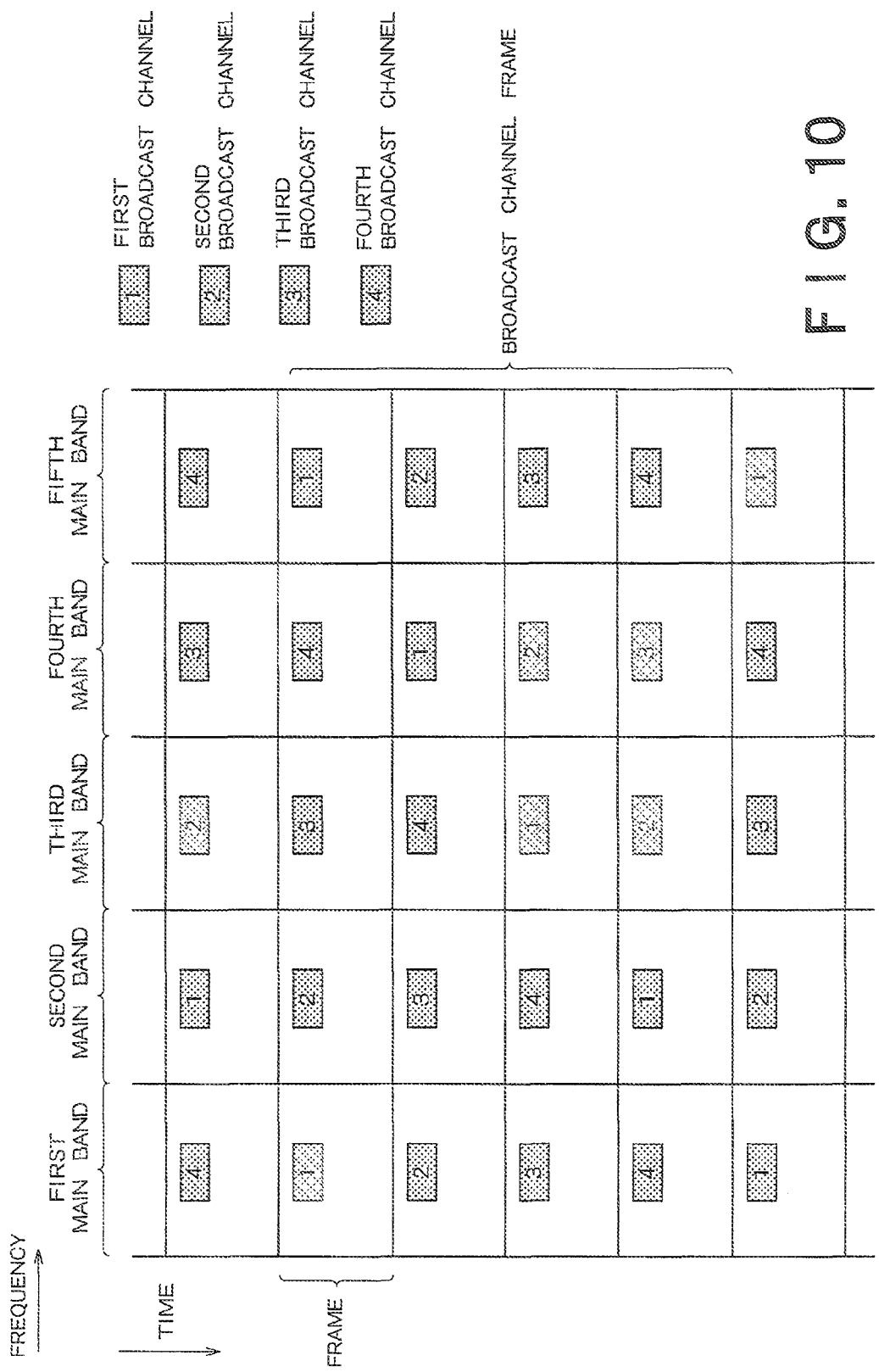
FIG. 10 is a diagram describing the order of transmission of broadcast channels according to the embodiment.

Using FIG. 10, the order of transmission of first to fourth broadcast channels in each of a plurality of main bands such as those shown in FIG. 3 will be described. Here, it is assumed that as main bands there are five main bands, first to fifth main bands. As shown in FIG. 10, in the same frame, when a first broadcast channel is transmitted in an nth main band (n is an integer greater than or equal to 1), a second broadcast channel is transmitted in an n+1th main band, and a third broadcast channel is transmitted in an n+2th main band.

That is, in the same frame, different broadcast channels are transmitted in adjacent main bands, and the arrangement order in a frequency direction of broadcast channels is: a first broadcast channel, a second broadcast channel, a third broadcast channel, a fourth broadcast channel, a first broadcast channel, . . . . In the time direction (frame direction) of each main band, first to fourth broadcast channels are repeatedly transmitted with this order being kept.

When broadcast channels are transmitted in such an order, in the case in which the terminal 104 which is a multi-band terminal has the function of receiving four or more main bands, the terminal 104 can receive all of first to fourth broadcast channels and obtain broadcast data in one frame. Accordingly, broadcast data can be obtained in a short time.

In all main bands, a signal such as that shown in FIG. 8 is transmitted. Thus, the terminals 101 to 103 which are single-band terminals can obtain broadcast data by the same method as a method of receiving a signal such as that shown in FIG. 8, without changing the configuration.

When the terminal 104 has not recognized how many frames in a broadcast channel frame there are before the currently received frame, in order to take out broadcast data from a plurality of broadcast channels included in one frame, the terminal 104 needs to assume a plurality of ways of arrangement of broadcast channels and then perform demodulation to find a way with which demodulation can be performed properly. However, if, by this process, the placement state of broadcast channels in one frame can be grasped, then the terminal 104 can know how many frames in a broadcast channel frame there are before the currently received frame.

For example, if the terminal 104 knows that a broadcast channel transmitted in the first main band in a given frame is a second broadcast channel, then the terminal 104 can determine that a first broadcast channel is transmitted in a frame previous to that frame, and thus can detect that that is a boundary of a broadcast channel frame.

As such, by receiving only one frame and thereby knowing a pattern in which broadcast channels are transmitted, a boundary of a broadcast channel frame can be detected.

Note that, when the terminal 104 has the function of receiving three main bands, it requires two frames to grasp a broadcast channel transmission pattern and detect a boundary of a broadcast channel frame. Note also that, when the terminal 104 has the function of receiving two main bands, it requires three frames to grasp a broadcast channel transmission pattern and detect a boundary of a broadcast channel frame.

Figure 11:
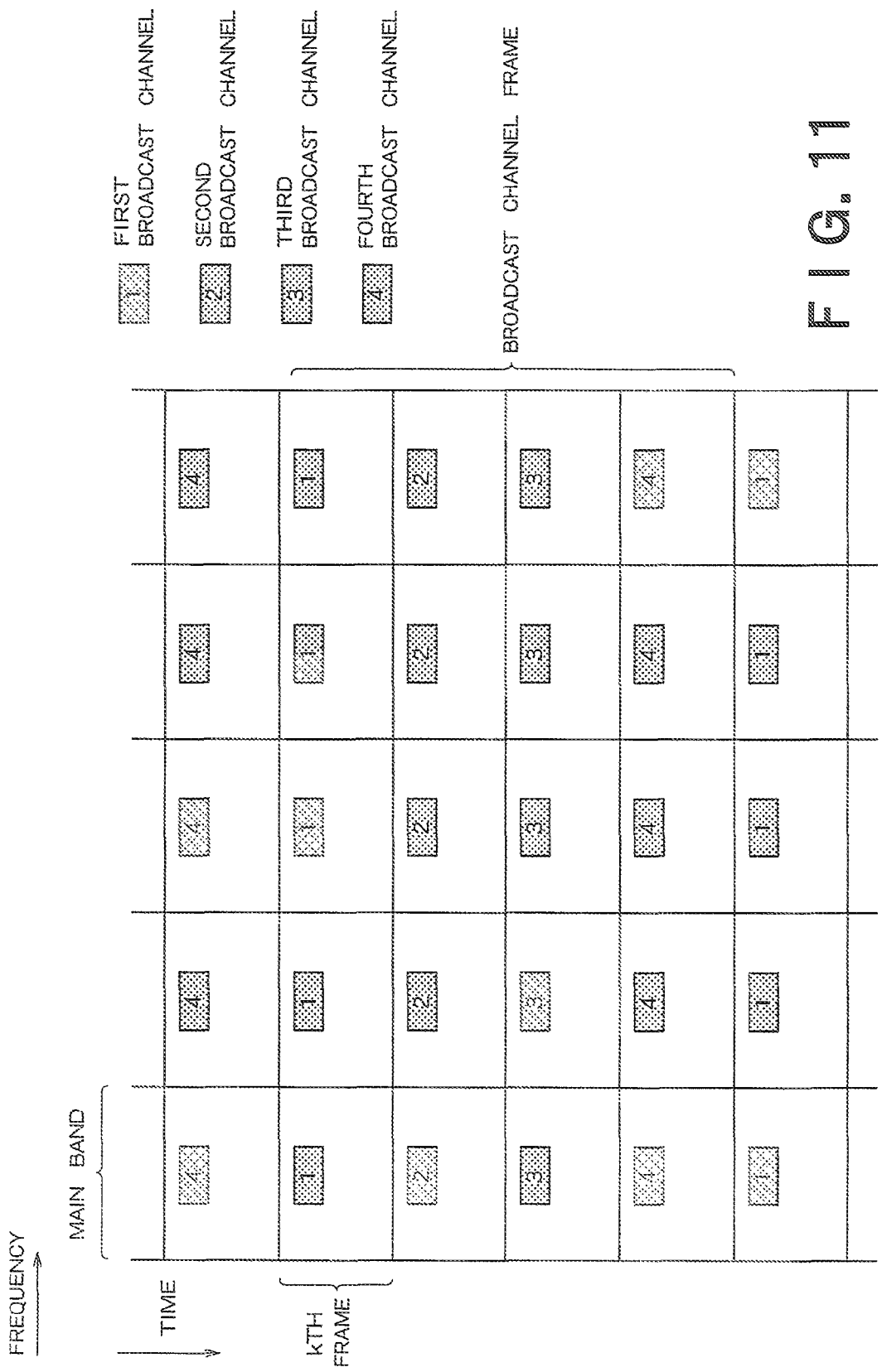
FIG. 11 is a diagram describing the order of transmission of broadcast channels in a comparative example.

FIG. 11 describes the order of transmission of first to fourth broadcast channels in each of a plurality of main bands in a comparative example. A first broadcast channel to a fourth broadcast channel are, as described above, transmitted in this order in four frames consecutive in the time direction. In addition, in each main band in the same frame, an identical broadcast channel is transmitted.

For example, in a kth frame in FIG. 11, first broadcast channels are transmitted in all main bands. When a multi-band terminal receives broadcast channels having such a transmission order, as with a single-band terminal, unless the multi-band terminal receives four consecutive frames, the multi-band terminal cannot obtain first to fourth broadcast channels. Namely, to obtain broadcast data, at least four frames need to be received. Accordingly, the throughput of the multi-band terminal decreases.

On the other hand, in the present embodiment, as shown in FIG. 10, by transmitting different broadcast channels in adjacent main bands in the same frame, the number of received frames required for the multi-band terminal to obtain broadcast data can be less than four, enabling to prevent a reduction in throughput. In addition, since, in all main bands, first to fourth broadcast channels are repeatedly transmitted with this order being kept, the single-band terminal can receive broadcast data properly.

Figure 12:
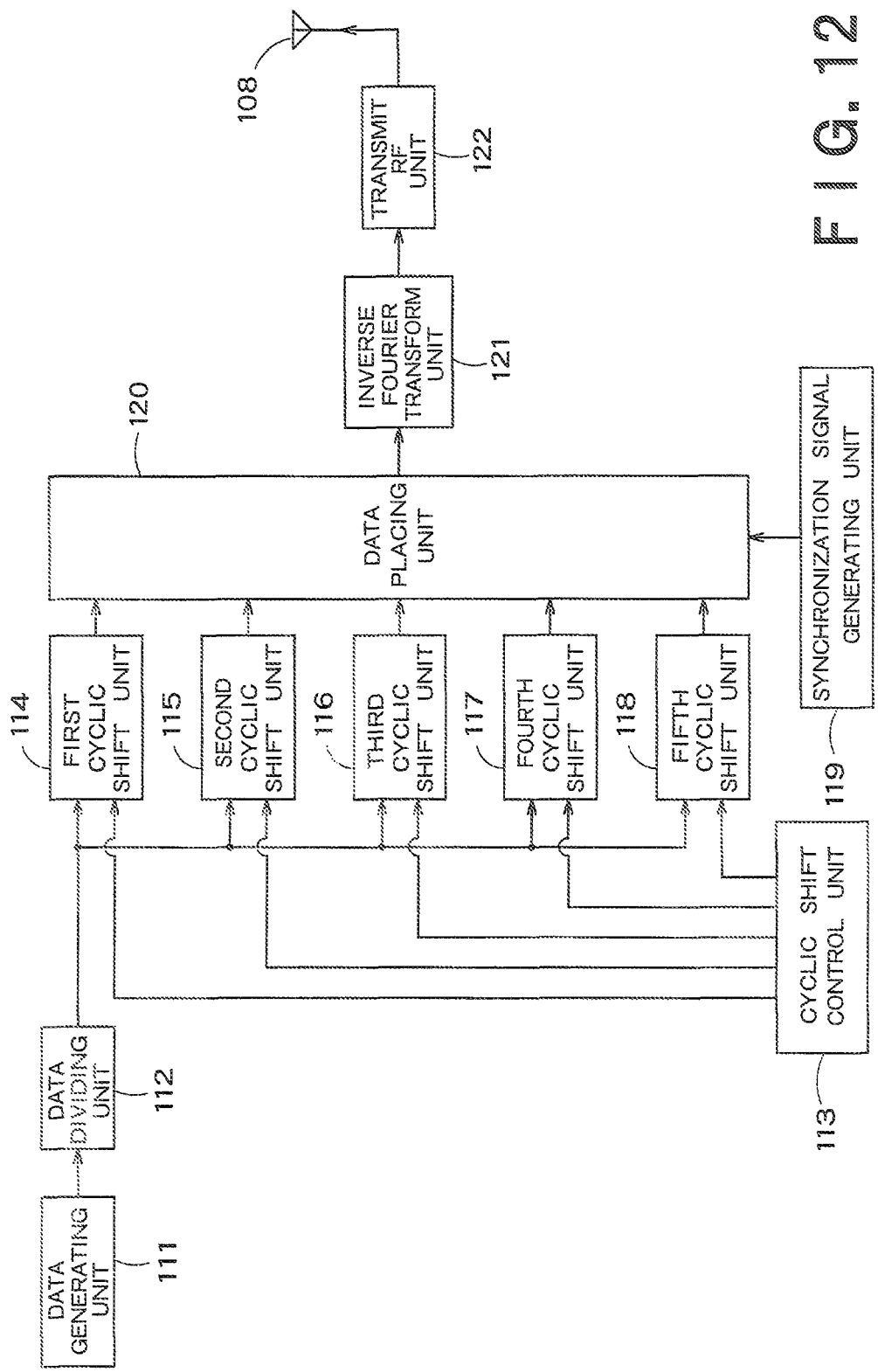
FIG. 12 is a schematic configuration diagram of a transmitter according to the embodiment.

FIG. 12 shows a schematic configuration of a transmitter (base station 105) that can transmit broadcast channels in the order such as that described above. The base station 105 includes a data generating unit 111, a data dividing unit 112, a cyclic shift control unit 113, first to fifth cyclic shift units 114 to 118, a synchronization signal generating unit 119, a data placing unit 120, an inverse Fourier transform unit 121, a transmit RF unit 122, and a transmitting antenna 108.

The data generating unit 111 generates broadcast data to be transmitted. The broadcast data includes information such as an ID of the base station 105, the bandwidths of main bands, the number of antennas for transmission, and transmit frame numbers. The data generating unit 111 performs error correction coding, addition of error detection code, and modulation on the broadcast data, and outputs the broadcast data to the data dividing unit 112.

The data dividing unit 112 divides the broadcast data generated by the data generating unit 111, into four parts and thereby generates four broadcast channels (first to fourth broadcast channels). The data dividing unit 112 outputs all of the four generated broadcast channels to each of the first to fifth cyclic shift units 114 to 118.

The first cyclic shift unit 114 performs a cyclic shift on the four broadcast channels generated by the data dividing unit 112. For example, when the amount of cyclic shift is 1, the first cyclic shift unit 114 outputs the second broadcast channel, the third broadcast channel, the fourth broadcast channel, and the first broadcast channel in this order in a broadcast channel frame. The amount of cyclic shift is provided from the cyclic shift control unit 113 which will be described later.

The second to fifth cyclic shift units 115 to 118 operate in the same manner as the first cyclic shift unit 114. Note, however, that, for the amount of cyclic shift, one that is provided from the cyclic shift control unit 113 which will be described later is used, and thus, it is not that all perform a cyclic shift using the same amount.

The cyclic shift control unit 113 generates and outputs amounts of cyclic shift for the respective first to fifth cyclic shift units 114 to 118. For example, to implement placement of broadcast channels such as that shown in FIG. 10, the cyclic shift control unit 113 provides amounts of cyclic shift of 0, 1, 2, 3, and 0 to the first to fifth cyclic shift units 114 to 118, respectively.

The synchronization signal generating unit 119 generates a synchronization signal and outputs the synchronization signal to the data placing unit 120.

The data placing unit 120 places the broadcast channels outputted from the first to fifth cyclic shift units 114 to 118 and the synchronization signals outputted from the synchronization signal generating unit 119, on subcarriers. For example, broadcast channels outputted from the first cyclic shift unit 114 are placed on a plurality of predetermined subcarriers located at the center of the first main band.

Broadcast channels outputted from the second to fifth cyclic shift units 115 to 118 are also likewise placed in the second to fifth main bands. Each broadcast channel is placed in the first 4 OFDM symbols in the second half slot of a first subframe in a frame.

The synchronization signals are also placed at the center of each main band, as with the broadcast channels. As shown in FIGS. 6 and 7, a synchronization signal is placed in the last 2 OFDM symbols in the first half slot of each of a first subframe and a sixth subframe in a frame.

The subcarriers on which the broadcast channels and the synchronization signals are placed by the data placing unit 120 are outputted to the inverse Fourier transform unit 121.

The inverse Fourier transform unit 121 performs an inverse Fourier transform on the subcarriers and provides cyclic prefixes.

The transmit RF unit 122 converts an output signal from the inverse Fourier transform unit 121 into a transmit RF signal, and transmits the transmit RF signal from the transmitting antenna 108.

Figure 13:
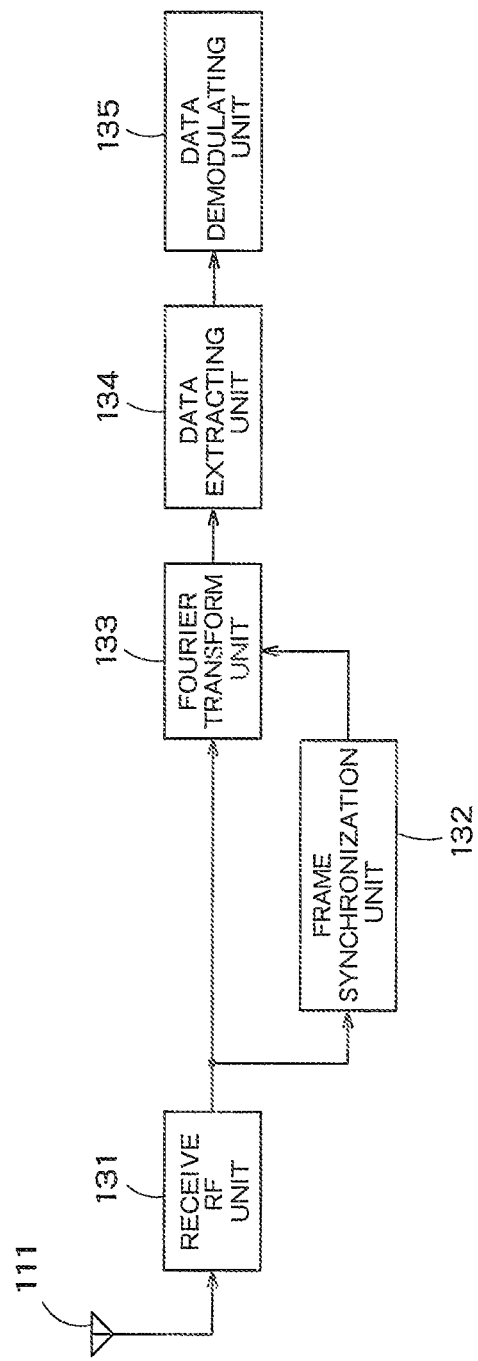
FIG. 13 is a schematic configuration diagram of a receiver according to the embodiment.

FIG. 13 shows a schematic configuration of a receiver (terminals 101 to 104). The receiver includes a receiving antenna 109, a receive RF unit 131, a frame synchronization unit 132, a Fourier transform unit 133, a data extracting unit 134, and a data demodulating unit 135.

The receive RF unit 131 converts a receive RF signal received through the receiving antenna 109, into a baseband signal and outputs the baseband signal to the frame synchronization unit 132 and the Fourier transform unit 133.

The frame synchronization unit 132 detects synchronization signals included in the receive baseband signal, and thereby grasps a frame boundary. By grasping a frame boundary, the positions of OFDM symbols can be determined. The frame synchronization unit 132 notifies the Fourier transform unit 133 of the position of the detected frame boundary.

The Fourier transform unit 133 cuts out OFDM symbols from the receive baseband signal based on the notification from the frame synchronization unit 132, and further removes cyclic prefixes. The Fourier transform unit 133 then performs conversion into subcarriers by a Fourier transform process. The subcarriers generated from the receive baseband signal by the Fourier transform unit 133 are outputted to the data extracting unit 134.

The data extracting unit 134 takes out broadcast channels from the subcarriers and outputs the broadcast channels to the data demodulating unit 135.

The data demodulating unit 135 connects the broadcast channels provided from the data extracting unit 134 and thereby obtains broadcast data, and performs demodulation and error correction processes on the broadcast data and thereby takes out information. At this time, when the receiver is a single-band terminal, the data demodulating unit 134 performs demodulation using broadcast channels for consecutive four frames. As described previously, although first to fourth broadcast channels are inputted in this order, the first one may not be the first broadcast channel. Thus, demodulation is tried in four ways at the maximum to find one that succeeds in demodulation through an error detection code test.

When the receiver is a multi-band terminal, a demodulation process is performed using broadcast channels included in one to three frames according to the number of receivable main bands.

The data demodulating unit 135 can detect a boundary of a broadcast channel frame (start (end) timing of a broadcast channel frame) from a broadcast channel pattern (order) with which demodulation has been succeeded. Based on the boundary of the broadcast channel frame, synchronization between the terminals 101 to 104 and the base station 105 is established, enabling to perform data communication thereafter.

A method of transmitting broadcast channels by the transmitter (base station 105) shown in FIG. 12 will be described using a flowchart shown in FIG. 14.

(Step S1401)

With the start of a transmission process, the synchronization signal generating unit 119 generates a synchronization signal which is agreed in advance between a transmitter and a receiver.

(Step S1402)

The data generating unit 111 generates information to be transmitted as broadcast data, i.e., an ID number of the base station 105, the bandwidths of main bands, etc.

(Step S1403)

The data generating unit 111 performs error correction coding of the information.

(Step S1404)

The data generating unit 111 provides error detection code to the information.

(Step S1405)

The data generating unit 111 performs modulation on the information and thereby generates broadcast data.

(Step S1406)

The data dividing unit 112 divides the broadcast data into four parts and thereby generates first to fourth broadcast channels.

The process of generating broadcast channels at steps S1402 to S1406 does not necessarily need to be performed every time a transmission process is performed. If there is no change in broadcast data from the last transmission process, then those broadcast channels used last time may be reused.
(Step S1407)

The cyclic shift control unit 113 determines amounts of cyclic shift C1 to C5 for first to fifth main bands.

For example, when performing placement of broadcast channels such as that shown in FIG. 10, the amounts of cyclic shift C1 to C5 are 0, 1, 2, 3, and 0. That is, the difference between the amounts of cyclic shift C1 and C2, the difference between the amounts of cyclic shift C2 and C3, and the difference between the amounts of cyclic shift C3 and C4 are equal to one another. In addition, the difference between the amounts of cyclic shift C4 and C5 is also equal thereto. This is because, when there are four broadcast channels, amounts of cyclic shift of 0 and 4 are the same.
(Step S1408)

The first cyclic shift unit 114 cyclically shifts four broadcast channels to be transmitted in the first main band, by C1.
(Step S1409)

The second cyclic shift unit 115 cyclic shifts four broadcast channels to be transmitted in the second main band, by C2.

For example, when C2 is 1, the second cyclic shift unit 115 rearranges four broadcast channels in the order of second, third, fourth, and first broadcast channels.
(Step S1410)

The third cyclic shift unit 116 cyclically shifts four broadcast channels to be transmitted in the third main band, by C3.
(Step S1411)

The fourth cyclic shift unit 117 cyclically shifts four broadcast channels to be transmitted in the fourth main band, by C4.
(Step S1412)

The fifth cyclic shift unit 118 cyclically shifts four broadcast channels to be transmitted in the fifth main band, by C5.

For example, when C5 is 0, the fifth cyclic shift unit 118 does not perform a cyclic shift, and thus, the order of four broadcast channels remains as the original order of first, second, third, and fourth broadcast channels.
(Step S1413)

Broadcast channels which are the first ones to be outputted form the respective cyclic shift units 114 to 118 and synchronization signals generated by the synchronization signal generating unit 119 are placed on subcarriers by the data placing unit 120, and are transmitted in a kth frame through the inverse Fourier transform unit 121, the transmit RF unit 122, and the transmitting antenna 108.
(Step S1414)

Broadcast channels which are the second ones to be outputted form the respective cyclic shift units 114 to 118 and synchronization signals generated by the synchronization signal generating unit 119 are placed on subcarriers by the data placing unit 120, and are transmitted in a k+1th frame through the inverse Fourier transform unit 121, the transmit RF unit 122, and the transmitting antenna 108.
(Step S1415)

Broadcast channels which are the third ones to be outputted form the respective cyclic shift units 114 to 118 and synchronization signals generated by the synchronization signal generating unit 119 are placed on subcarriers by the data placing unit 120, and are transmitted in a k+2th frame through the inverse Fourier transform unit 121, the transmit RF unit 122, and the transmitting antenna 108.
(Step S1416)

Broadcast channels which are the fourth ones to be outputted form the respective cyclic shift units 114 to 118 and synchronization signals generated by the synchronization signal generating unit 119 are placed on subcarriers by the data placing unit 120, and are transmitted in a k+3th frame through the inverse Fourier transform unit 121, the transmit RF unit 122, and the transmitting antenna 108.

By repeating steps S1413 to S1416, broadcast channels are transmitted in the order such as that shown in FIG. 10.

Figure 15:
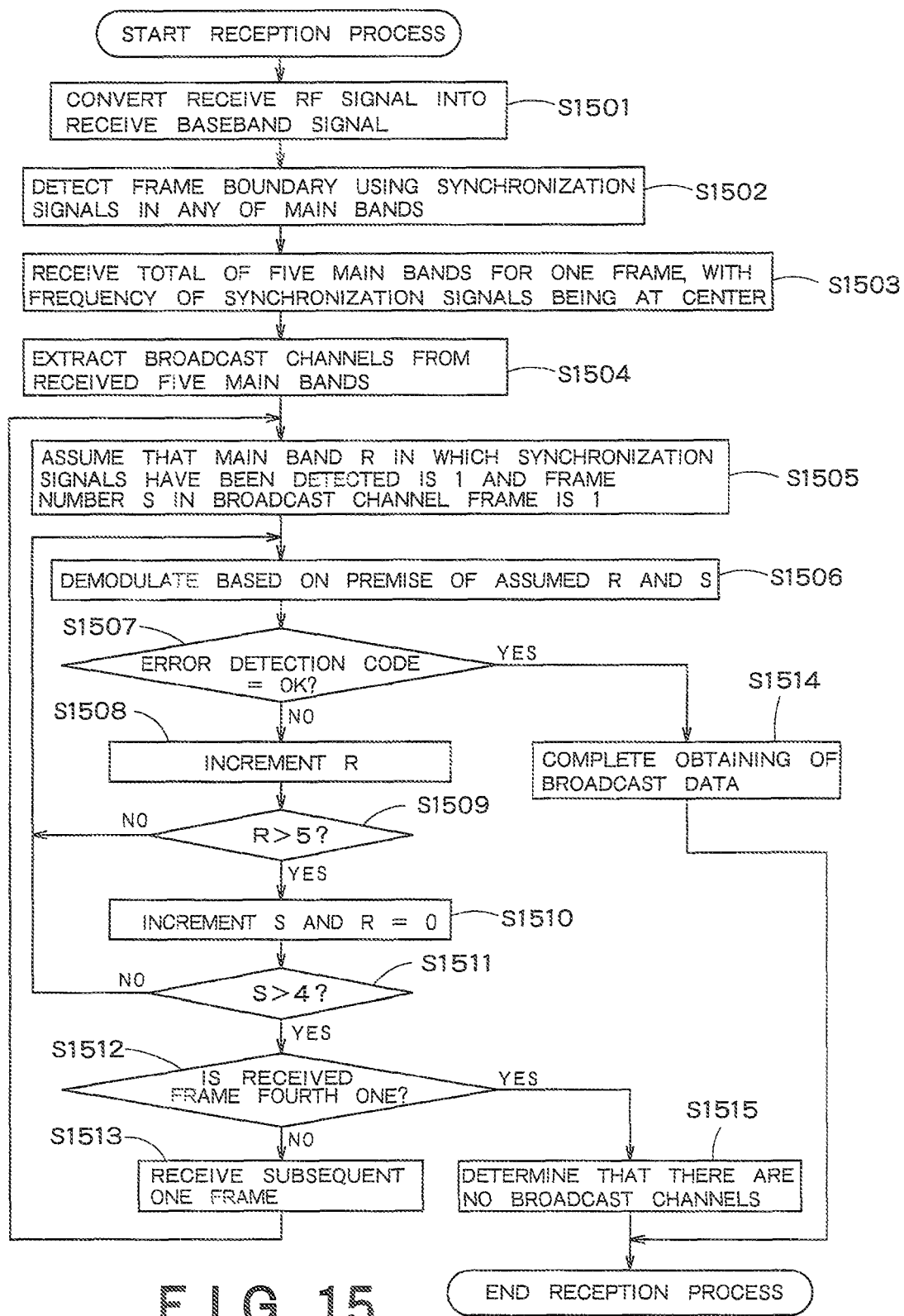
FIG. 15 is a flowchart describing a method of receiving broadcast channels according to the embodiment.

A method of receiving broadcast channels by the receiver shown in FIG. 13 will be described using a flowchart shown in FIG. 15. Here, the receiver is a multi-band terminal having the function of receiving five main bands.
(Step S1501)

With the start of a reception process, the receive RF unit 131 converts a receive RF signal received through the receiving antenna 109 into a receive baseband signal.
(Step S1502)

The frame synchronization unit 132 establishes frame synchronization using synchronization signals in the receive baseband signal. When the frame synchronization unit 132 cannot detect synchronization signals, the receiver considers that a signal has not been transmitted. When synchronization signals are detected and thus frame synchronization can be established, it is considered that the base station 105 has transmitted a signal.

Note, however, that at this point in time the receiver does not know which main band the receiver is receiving. Note also that at this point in time the receiver can know a boundary between frames but has not identified a boundary of a broadcast channel frame.
(Step S1503)

Based on the frame boundary, the Fourier transform unit 133 receives signals in five main bands for one frame, with the frequency of the detected synchronization signals being at the center.
(Step S1504)

The Fourier transform unit 133 cuts out the signals in the five main bands and performs a Fourier transform to take out subcarriers. At this point in time, since the receiver still does not know which main band the receiver is receiving, regardless of whether there are broadcast channels, the data extracting unit 134 takes out modulation symbols from those portions of the Fourier-transformed signals in the five main bands corresponding to broadcast channels.

For example, as shown in (a) of FIG. 16, when the frame synchronization unit 132 detects synchronization signals in the first main band, of five main bands in which a Fourier transform is performed by the Fourier transform unit 133, two main bands with low frequencies do not include broadcast channels. On the other hand, three main bands with high frequencies, i.e., the first to third main bands, include broadcast channels.

Likewise, when the frame synchronization unit 132 detects synchronization signals in the second main band, as shown in (b) of FIG. 16, of five main bands in which a Fourier transform is performed by the Fourier transform unit 133, one main band with the lowest frequency does not include a broadcast channel. On the other hand, four main bands with high frequencies, i.e., the first to fourth main bands, include broadcast channels.

Likewise, when the frame synchronization unit 132 detects synchronization signals in the third main band, as shown in (c) of FIG. 16, in five main bands in which a Fourier transform is performed by the Fourier transform unit 133, all of the first to fifth main bands include broadcast channels.

Likewise, when the frame synchronization unit 132 detects synchronization signals in the fourth main band, as shown in (d) of FIG. 16, of five main bands in which a Fourier transform is performed by the Fourier transform unit 133, one main band with the highest frequency does not include a broadcast channel. On the other hand, four main bands with low frequencies, i.e., the second to fifth main bands, include broadcast channels.

Likewise, when the frame synchronization unit 132 detects synchronization signals in the fifth main band, as shown in (e) of FIG. 16, of five main bands in which a Fourier transform is performed by the Fourier transform unit 133, two main bands with high frequencies do not include broadcast channels. On the other hand, three main bands with low frequencies, i.e., the third to fifth main bands, include broadcast channels.
(Step S1505)

The data demodulating unit 135 performs demodulation of the broadcast channels. Note, however, that at this point in time it is unknown how the broadcast channels extracted at step S1504 are arranged. Hence, it is assumed that the number for the main band in which the synchronization signals are received at step S1502 is R, and the number for the frame in which the Fourier transform is performed at step S1504 is S.

For example, when it is assumed that the main band in which the synchronization signals are received at step S1502 is the first main band and the frame in which the Fourier transform is performed at step S1504 is the first frame in a broadcast channel frame, R=1 and S=1. At this time, if the broadcast channels are transmitted using signal placement such as that shown in FIG. 10, then a first broadcast channel is supposed to be transmitted in a central main band obtained after the Fourier transform, a second broadcast channel is supposed to be transmitted in a main band adjacent to and higher in frequency than the central main band, and a third broadcast channel is supposed to be transmitted in a main band with the highest frequency.
(Step S1506)

Demodulation is performed based on the assumed broadcast channel arrangement. Here, since in the above-described assumption a fourth broadcast channel is supposed to be not received, 0 is set upon demodulation. Depending on the circumstances of a transmission path, even if one broadcast channel is 0, there is a possibility that information is properly obtained by error correction code.
(Step S1507)

The data demodulating unit 135 checks error detection code. If the check result is "correct", then processing proceeds to step S1514. If the check result is "error", then processing proceeds to step S1508.
(Step S1508)

R is incremented (one is added).
(Step S1509)

If R is less than 5 or equal to 5, then processing returns to step S1506. If R exceeds 5, then processing proceeds to step S1510.
(Step S1510)

R is reset to 0 and S is incremented (one is added).
(Step S1511) If S is less than or equal to 4, then processing returns to step S1506. If S exceeds 4, then processing proceeds to step S1512.
(Step S1512)

If the number of received frames is four, then processing proceeds to step S1515. If the number of received frames is less than four, then processing proceeds to step S1513.
(Step S1513)

Signals in the five main bands for one frame are newly received, and processing returns to step S1505.

By this, the number of broadcast channels usable for demodulation increases. For example, when R=0 and S=0 are true but demodulation cannot be performed properly, by newly receiving the next one frame, as broadcast channels usable for demodulation, second, third, and fourth broadcast channels are newly added to first, second, and third broadcast channels obtained previously.

Accordingly, for the second and third broadcast channels, by adding signals, signal reliability is improved, and by performing demodulation using also the newly added fourth broadcast channel, broadcast data can be demodulated properly with high probability.
(Step S1514)

Information transmitted using broadcast data is obtained. In addition, since the assumption about R and S made upon demodulation at step S1506 is correct, the number for the received main band and the frame number in the broadcast channel frame can be obtained.
(Step S1515)

It is determined that broadcast channels are not included, and thus the process ends.

As such, demodulation is repeated with R=0 to R=5 and S=1 to S=4 to detect R and S with which demodulation can be performed properly. Then, information transmitted using broadcast data is obtained, and a received main band and a boundary of a broadcast channel frame can be identified.

By transmitting broadcast channels using placement such as that shown in FIG. 10, a multi-band terminal can perform obtaining of broadcast data and identifying of a boundary of a broadcast channel frame in a period of time of three frames or less. When broadcast channels are transmitted using placement such as that shown in FIG. 11, a period of time of at least four frames is required. Thus, the reception processing time can be reduced. In addition, a single-band terminal can properly perform obtaining of broadcast data and identifying of a boundary of a broadcast channel frame regardless of which main band is received.

As such, by the present embodiment, a reduction in the throughput of a multi-band terminal can be prevented and a single-band terminal can be allowed to receive data properly.

Figure 17:
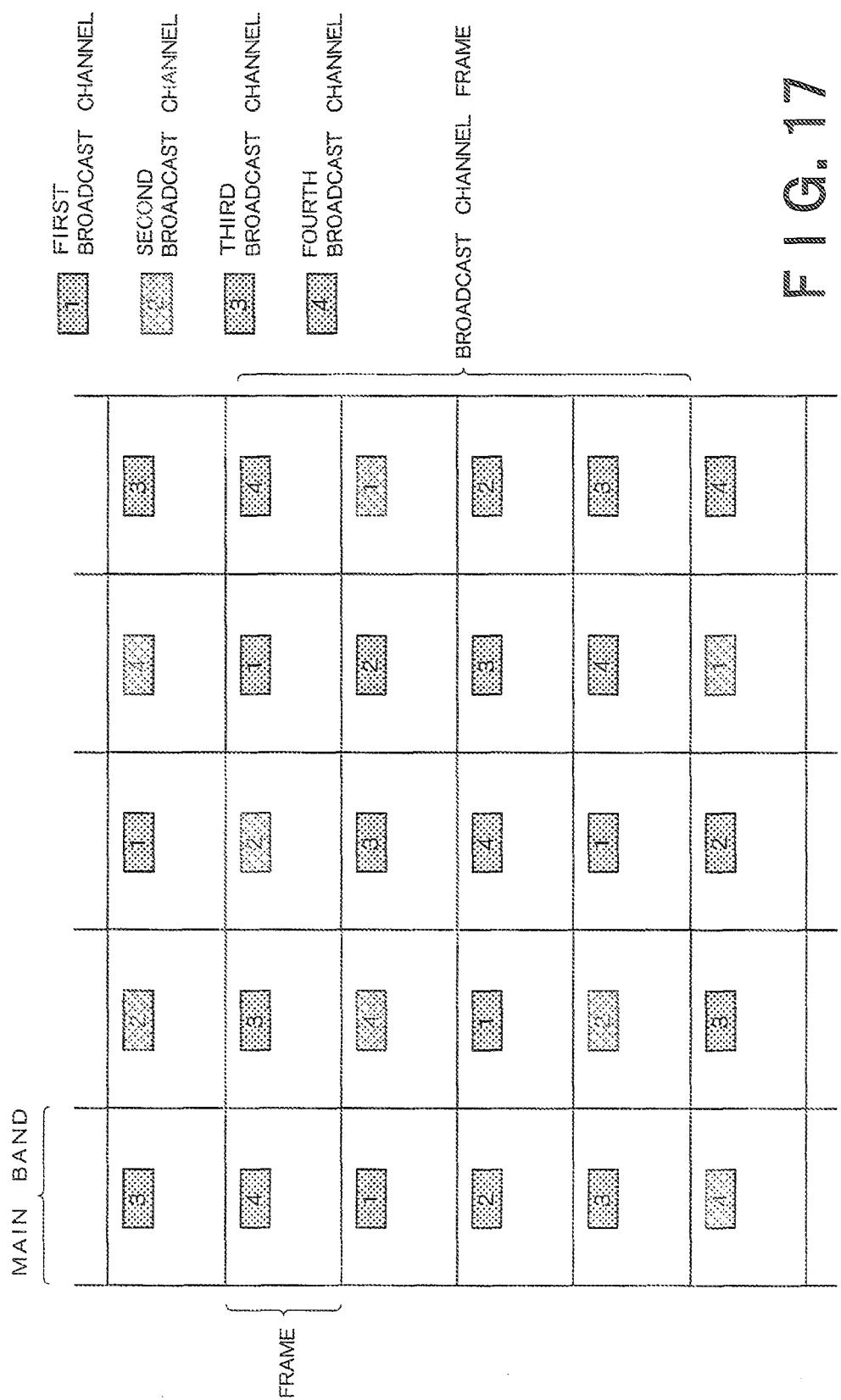
FIG. 17 is a diagram describing the order of transmission of broadcast channels in a variant.

Although in an example shown in FIG. 10 broadcast channels transmitted in the same frame are placed in the order of a first broadcast channel, a second broadcast channel, a third broadcast channel, a fourth broadcast channel, a first broadcast channel, . . . , in a main band direction, as shown in FIG. 17, the broadcast channels may be placed in the order of a fourth broadcast channel, a third broadcast channel, a second broadcast channel, a first broadcast channel, a fourth broadcast channel, . . . .

Figure 18:
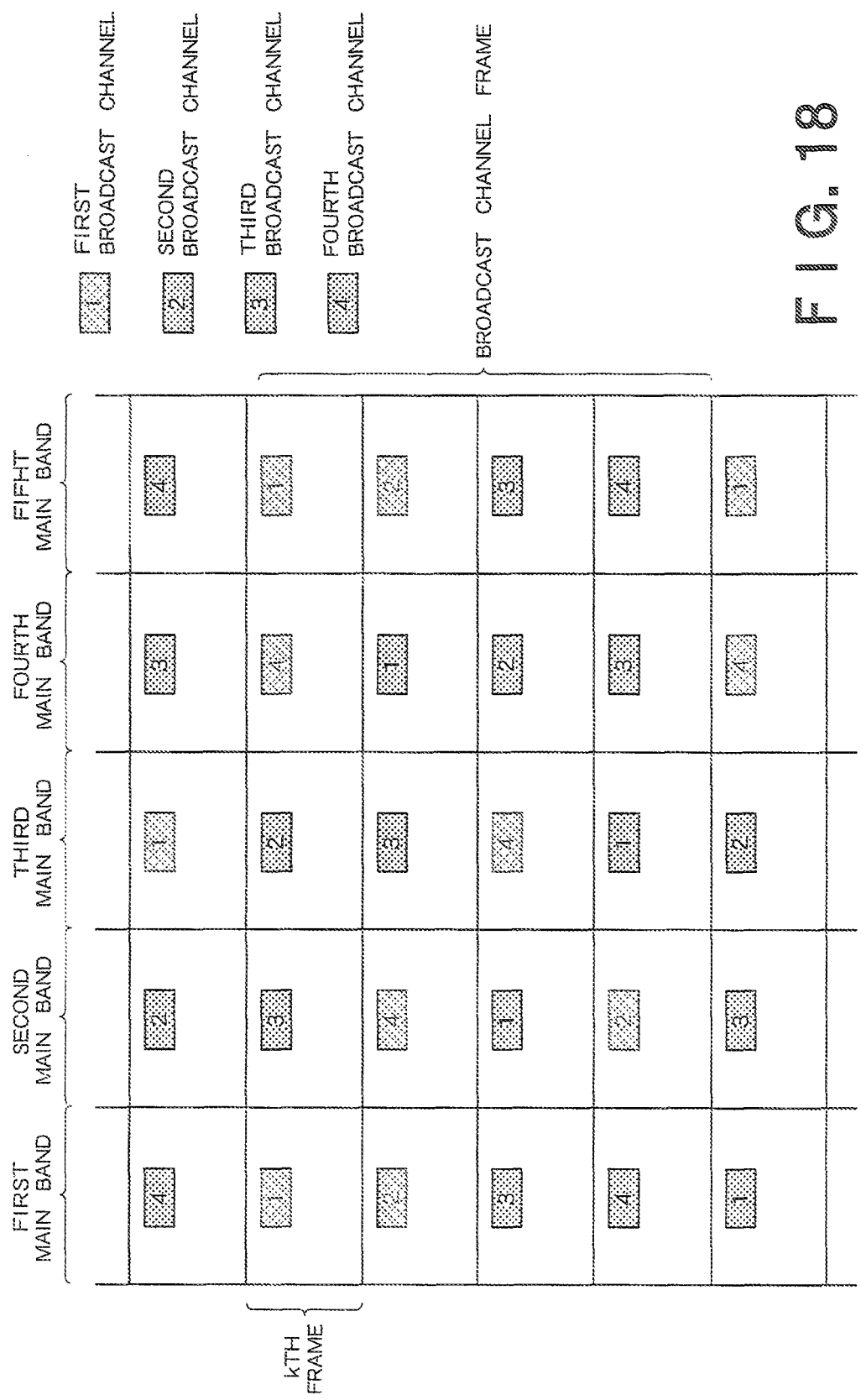
FIG. 18 is a diagram describing the order of transmission of broadcast channels in a variant.

Alternatively, as shown in FIG. 18, broadcast channels transmitted in the same frame may be placed in the order of a first broadcast channel, a third broadcast channel, a second broadcast channel, a fourth broadcast channel, a first broadcast channel, . . . , in the main band direction.

That is, broadcast channels are placed such that an interval between a broadcast channel transmitted in an nth main band and a broadcast channel transmitted in an n+1th main band differs from an interval between a broadcast channel transmitted in the n+1th main band and a broadcast channel transmitted in an n+2th main band in the same frame.

For example, in a kth frame, since a first broadcast channel is transmitted in the first main band and a third broadcast channel is transmitted in the second main band, the interval is "+2". Since a third broadcast channel is transmitted in the second main band and a second broadcast channel is transmitted in the third main band, the interval is "−1". Note that, when broadcast data is divided into first to fourth broadcast channels, the interval "−1" is the same as the interval "+3".

Such broadcast channel placement is excellent in terms of identifying a boundary of a broadcast channel frame and recognizing main bands for the following reason.

When taking a look at a pattern (the way of arrangement) of three broadcast channels arranged in the main band direction, the same pattern does not appear a plurality of times in five main bands and one broadcast channel frame. For example, a pattern of broadcast channels placed in the first to third main bands in the kth frame, i.e., a pattern of first, third, and second broadcast channels, does not appear at any location in the same broadcast channel frame.

Therefore, a multi-band terminal having detected that first, third, and second broadcast channels are arranged in the main band direction can promptly recognize that that is where there are the first to third main bands and where there is the first frame in the broadcast channel frame.

Such broadcast channel placement can be implemented by the cyclic shift control unit 113 setting the amounts of cyclic shift C1 to C5 to 0, 2, 1, 3, and 0. The difference between the amounts of shift C1 and C2 differs from the difference between the amounts of shift C2 and C3. Likewise, the difference between the amounts of shift C2 and C3 differs from the difference between the amounts of shift C3 and C4.

Although the above-described embodiment describes an example in which broadcast data is divided into four broadcast channels, the number of divisions may be other than four.

At least a part of a terminal and a base station described in the above-described embodiment may be configured by hardware or may be configured by software. In the case of configuring by software, a program that implements at least one of the functions of the terminal and the base station may be stored in a recording medium, such as a flexible disk or a CD-ROM, and may be loaded onto a computer to cause the computer to execute the program. The recording medium is not limited to a removable one such as a magnetic disk or an optical disk, and may be a fixed type recording medium such as a hard disk device or a memory.

Note that the present invention is not limited to the above-described embodiment as it is, and may be embodied by modifying the components in the implementing stage without departing from the true spirit and scope of the present invention. Note also that, by appropriately combining a plurality of components disclosed in the above-described embodiment, various inventions may be made. For example, some of all of the components described in the embodiment may be eliminated. Furthermore, the components in different embodiments may be appropriately combined.

DESCRIPTION OF REFERENCE NUMERALS

101 to 104: TERMINAL
105: BASE STATION
106: DOWNLINK
107: UPLINK
108 and 109: ANTENNA
111: DATA GENERATING UNIT
112: DATA DIVIDING UNIT
113: CYCLIC SHIFT CONTROL UNIT
114 to 118: CYCLIC SHIFT UNIT
119: SYNCHRONIZATION SIGNAL GENERATING UNIT
120: DATA PLACING UNIT
121: INVERSE FOURIER TRANSFORM UNIT
122: TRANSMIT RF UNIT
131: RECEIVE RF UNIT
132: FRAME SYNCHRONIZATION UNIT
133: FOURIER TRANSFORM UNIT
134: DATA EXTRACTING UNIT
135: DATA DEMODULATING UNIT

The invention claimed is:

1. A wireless communication device that performs communication using first to n-th main bands, the wireless communication device comprising:
   a data generating unit that generates broadcast data;
   a dividing unit that divides the broadcast data into m broadcast channels,
   a control unit that generates first to n-th amounts of shift to be provided to signals transmitted in the first to n-th main bands;
   n shift units, each shift unit outputting, in a corresponding main band, the m broadcast channels in an order of transmission of the m broadcast channels, the order for each shift unit being determined according to a respective one of the amounts of shift generated by the control unit;
   a placing unit that places the broadcast channels outputted from the shift units, on subcarriers in the first to n-th main bands; and
   a transmitting unit that converts the subcarriers in the first to n-th main bands into a transmit RF signal and transmits the transmit RF signal, the subcarriers having the broadcast channels placed thereon, wherein
   the control unit generates the amounts of shift such that the broadcast channels transmitted in corresponding frames of the different main bands are different and a difference between the first amount of shift and the second amount of shift differs from a difference between the second amount of shift and the third amount of shift, and
   a broadcast channel outputted according to the first amount of shift is placed on an (i−1)-th main band; a broadcast channel outputted according to the second amount of shift is placed on an i-th main band; and a broadcast channel outputted according to the third amount of shift is placed on an (i+1)-th main band.

2. The wireless communication device according to claim 1, wherein a k-th one of the shift units (k is an integer satisfying 1≤k≤n) outputs the broadcast channels in an order in which a j-th broadcast channel (j is an integer satisfying 1<j<m−1) and a (j+1)-th broadcast channel are consecutive and an m-th broadcast channel and a first broadcast channel are consecutive.

3. The wireless communication device according to claim 1, wherein the first to n-th main bands are consecutive frequency bands.

4. A wireless communication device comprising:
   a receiving unit that receives a signal in which the same m broadcast channels are cyclically transmitted in each of first to n-th main bands, and first to n-th shift amounts are respectively associated with the first to n-th main bands such that the broadcast channels transmitted in corresponding frames of the different main bands are different;
   an extracting unit that extracts the broadcast channels from the respective plurality of main bands; and
   a demodulating unit that connects the extracted broadcast channels and thereby obtains broadcast data, wherein
   a difference between the shift amount for the broadcast channels in the (i−1)-th main band and the shift amount for the broadcast channels in the i-th main band is different than a difference between the shift amount for the broadcast channels in the i-th main band and the shift amount for the broadcast channels in the (i+1)-th main band.

5. The wireless communication device according to claim 4, wherein the device recognizes on which main bands the received broadcast channels are present based on one or more of patterns of broadcast channels.

6. The wireless communication device according to claim 1, further comprising:
   a synchronization signal generating unit configured to generate a synchronization signal,
   wherein the subcarriers in the first to n-th main bands further include the synchronization signal.

7. A wireless communication device comprising a receiver configured to receive the transmit RF signal transmitted by the wireless communication device according to claim 1.

8. A wireless communication device for communicating using first to n-th main bands, the wireless communication device comprising:
   a data generating unit configured to generate broadcast data;
   a dividing unit configured to divide the broadcast data into m broadcast channels;
   a control unit configured to generate first to n-th amounts of shift for broadcast channels transmitted in the first to n-th main bands; and
   a transmitter configured to convert subcarriers in the first to n-th main bands into a transmit RF signal and to transmit the transmit RF signal, wherein
   the broadcast channels are cyclically transmitted in each of the first to n-th main bands and by the first to n-th amounts of shift are respectively applied to the first to n-th main bands such that the broadcast channels transmitted in corresponding frames of the different main bands are different, and
   a difference between the shift amount for the broadcast channels in the (i−1)-th main band and the shift amount for the broadcast channels in the i-th main band is different than a difference between the shift amount for the broadcast channels in the i-th main band and the shift amount for the broadcast channels in the (i+1)-th main band.

9. The wireless communication device according to claim 8, further comprising:
   a synchronization signal generating unit configured to generate a synchronization signal,
   wherein the subcarriers in the first to n-th main bands further include the synchronization signal.

10. A wireless communication device comprising a receiver configured to receive the transmit RF signal transmitted by the wireless communication device according to claim 8.

11. A wireless communication device for communicating using first to n-th main bands, the wireless communication device comprising:
   a transmitter; and
   a computer configured to execute a program for controlling the wireless communication device to at least:
   divide broadcast data into m broadcast channels;
   generate first to n-th amounts of shift for broadcast channels transmitted in the first to n-th main bands; and
   in cooperation with the transmitter, convert subcarriers in the first to n-th main bands into a transmit RF signal and transmit the transmit RF signal, wherein
   the broadcast channels are cyclically transmitted in each of the first to n-th main bands and the first to n-th amounts of shift are respectively applied to the first to n-th main bands such that the broadcast channels transmitted in corresponding frames of the different main bands are different, and
   a difference between the shift amount for the broadcast channels in the (i−1)-th main band and the shift amount for the broadcast channels in the i-th main band is different than a difference between the shift amount for the broadcast channels in the i-th main band and the shift amount for the broadcast channels in the (i+1)-th main band.

* * * * *

UNITED STATES PATENT AND TRADEMARK OFFICE
CERTIFICATE OF CORRECTION

| | | |
|---|---|---|
| PATENT NO. | : 8,824,393 B2 | Page 1 of 1 |
| APPLICATION NO. | : 13/189917 | |
| DATED | : September 2, 2014 | |
| INVENTOR(S) | : Sakata et al. | |

It is certified that error appears in the above-identified patent and that said Letters Patent is hereby corrected as shown below:

Title Page, Item (73) Assignee: change "Kabusiki Kaisha Toshiba" to --Kabushiki Kaisha Toshiba--

Signed and Sealed this
Seventeenth Day of March, 2015

Michelle K. Lee
*Director of the United States Patent and Trademark Office*